United States Patent
Cervenka

(10) Patent No.: US 6,749,252 B2
(45) Date of Patent: Jun. 15, 2004

(54) FOLD-OUT CAMPER FOR A PICK-UP TRUCK

(75) Inventor: Dean A. Cervenka, Lafayette, IN (US)

(73) Assignee: DAC Sky, LLC, Lafayette, IN (US)

( * ) Notice: Subject to any disclaimer, the term of this patent is extended or adjusted under 35 U.S.C. 154(b) by 0 days.

(21) Appl. No.: 10/313,404

(22) Filed: Dec. 6, 2002

(65) Prior Publication Data

US 2003/0146646 A1 Aug. 7, 2003

Related U.S. Application Data

(60) Provisional application No. 60/355,364, filed on Feb. 7, 2002.

(51) Int. Cl.[7] .................................................. B60P 3/39
(52) U.S. Cl. ..................... 296/165; 296/169; 296/174
(58) Field of Search ................................ 296/165, 169, 296/174, 175, 173, 176, 69, 164

(56) References Cited

U.S. PATENT DOCUMENTS

| | | | | |
|---|---|---|---|---|
| 1,216,986 A | * | 2/1917 | Habig | 296/169 |
| 1,285,794 A | * | 11/1918 | Reid | 296/169 |
| 1,327,589 A | * | 1/1920 | Bunker | 296/174 |
| 1,460,464 A | * | 7/1923 | Wilson | 296/174 |
| 1,466,224 A | * | 8/1923 | Hans | 296/174 |
| 1,527,105 A | | 2/1925 | Zagelmeyer | |
| 1,551,864 A | * | 9/1925 | Bothwell | 296/174 |
| 1,578,390 A | * | 3/1926 | Brown | 296/169 |
| 1,595,541 A | * | 8/1926 | Borah | 296/174 |
| 1,857,081 A | * | 5/1932 | Fontain | 296/169 |
| 1,864,047 A | | 6/1932 | Lawhorne | |
| 2,152,713 A | * | 4/1939 | Stewart | 296/169 |
| 2,957,482 A | * | 10/1960 | Tomek | 296/173 |
| 2,969,074 A | | 1/1961 | Willis | |
| 2,984,515 A | | 5/1961 | Hocks et al. | |
| 3,000,664 A | | 9/1961 | Martin | |
| 3,286,414 A | * | 11/1966 | Harrison et al. | 296/165 |
| 3,360,294 A | * | 12/1967 | Cieslak | 296/165 |
| 3,371,954 A | * | 3/1968 | Larsson | 296/169 |
| 3,429,608 A | | 2/1969 | Famum | |
| 3,464,735 A | * | 9/1969 | Smith | 296/169 |
| 3,466,082 A | | 9/1969 | Branch | |
| 3,582,131 A | | 6/1971 | Brown | |
| 3,596,416 A | | 8/1971 | Hojka | |
| 3,652,122 A | * | 3/1972 | Beauregard | 296/169 |
| 3,658,375 A | * | 4/1972 | Bowen | 296/165 |
| 3,675,885 A | * | 7/1972 | Shute | 296/165 |
| 3,737,190 A | | 6/1973 | Smith et al. | |
| 3,807,104 A | | 4/1974 | Webster | |
| 3,858,744 A | * | 1/1975 | Garvert | 296/174 |
| 4,005,898 A | * | 2/1977 | Way | 296/174 |
| 4,012,070 A | | 3/1977 | Mertz | |
| 4,027,911 A | | 6/1977 | Johnson | |
| 4,027,912 A | | 6/1977 | Pacca | |
| 4,083,596 A | | 4/1978 | Robertson | |
| 4,085,762 A | | 4/1978 | O'Brian et al. | |
| 4,109,954 A | | 8/1978 | Wall | |
| 4,113,301 A | * | 9/1978 | Olmstead | 296/169 |
| 4,209,421 A | * | 6/1980 | Heimerl et al. | 588/15 |

(List continued on next page.)

Primary Examiner—Kiran Patel
(74) Attorney, Agent, or Firm—Trexler, Bushnell, Giangiorgi, Blackstone & Marr, Ltd.

(57) ABSTRACT

A fold-out camper which is mounted in the bed of a truck provides a convenient shelter. The camper includes an upper and lower frame which, when retracted, are contained within the truck bed without obstructing the cargo area of the bed. To extend the camper, legs are extended from the lower frame to lift the upper frame and a cover which functions as the roof of the camper. Left and right side beds are rotated from their retracted position next to the wheel wells to an extended position over the wheel wells and over the sides of the truck bed. Tent walls which are stored with the left and right side beds and under the cover and are unrolled to enclose the camper.

20 Claims, 8 Drawing Sheets

U.S. PATENT DOCUMENTS

| | | | |
|---|---|---|---|
| 4,279,440 A | | 7/1981 | Golding, Sr. |
| 4,294,484 A | | 10/1981 | Robertson |
| 4,328,989 A | * | 5/1982 | Childers ..................... 296/175 |
| 4,542,932 A | | 9/1985 | Whiteman |
| 4,566,729 A | | 1/1986 | Magnino |
| 4,603,901 A | * | 8/1986 | McIntosh et al. ........... 296/165 |
| 4,607,876 A | * | 8/1986 | Reed .......................... 296/165 |
| 4,784,429 A | | 11/1988 | Hodges |
| 4,807,924 A | | 2/1989 | Kottke |
| 4,815,786 A | * | 3/1989 | McRay ....................... 296/165 |
| 4,923,242 A | | 5/1990 | Gentzhorn |
| 4,981,319 A | * | 1/1991 | Gerzeny et al. ............ 296/165 |
| 5,002,329 A | * | 3/1991 | Rafi-Zadeh ................. 248/166 |
| 5,143,417 A | * | 9/1992 | Philley et al. ............... 296/176 |
| 5,462,330 A | | 10/1995 | Brown |
| 5,478,129 A | | 12/1995 | Goto et al. |
| 5,505,513 A | * | 4/1996 | Carsner ....................... 296/69 |
| 5,505,515 A | * | 4/1996 | Turner ........................ 296/165 |
| 5,704,677 A | * | 1/1998 | Steury et al. ................ 296/175 |
| 5,735,565 A | * | 4/1998 | Papai et al. .................. 296/165 |
| 5,752,736 A | * | 5/1998 | Nodier ........................ 296/164 |
| 5,769,485 A | * | 6/1998 | Bontrager et al. ........... 296/173 |
| 5,788,319 A | | 8/1998 | Pruitt |
| 5,951,096 A | * | 9/1999 | Steury et al. ................ 296/175 |
| 5,979,972 A | | 11/1999 | Gehman |
| 6,017,080 A | | 1/2000 | Gill |
| 6,102,468 A | * | 8/2000 | Lowrey et al. .............. 296/174 |
| 6,135,525 A | | 10/2000 | Amann |
| 6,170,502 B1 | | 1/2001 | Pullen |
| 6,206,456 B1 | * | 3/2001 | Steury et al. ................ 296/173 |
| 6,209,944 B1 | | 4/2001 | Billiu et al. |
| 6,217,106 B1 | * | 4/2001 | Reckner, Jr. ................ 296/169 |
| 6,283,536 B1 | * | 9/2001 | Muzyka et al. ............. 296/165 |
| 6,443,516 B2 | * | 9/2002 | Lambright ................... 296/173 |
| 6,604,777 B2 | * | 8/2003 | Neville ........................ 296/165 |

\* cited by examiner

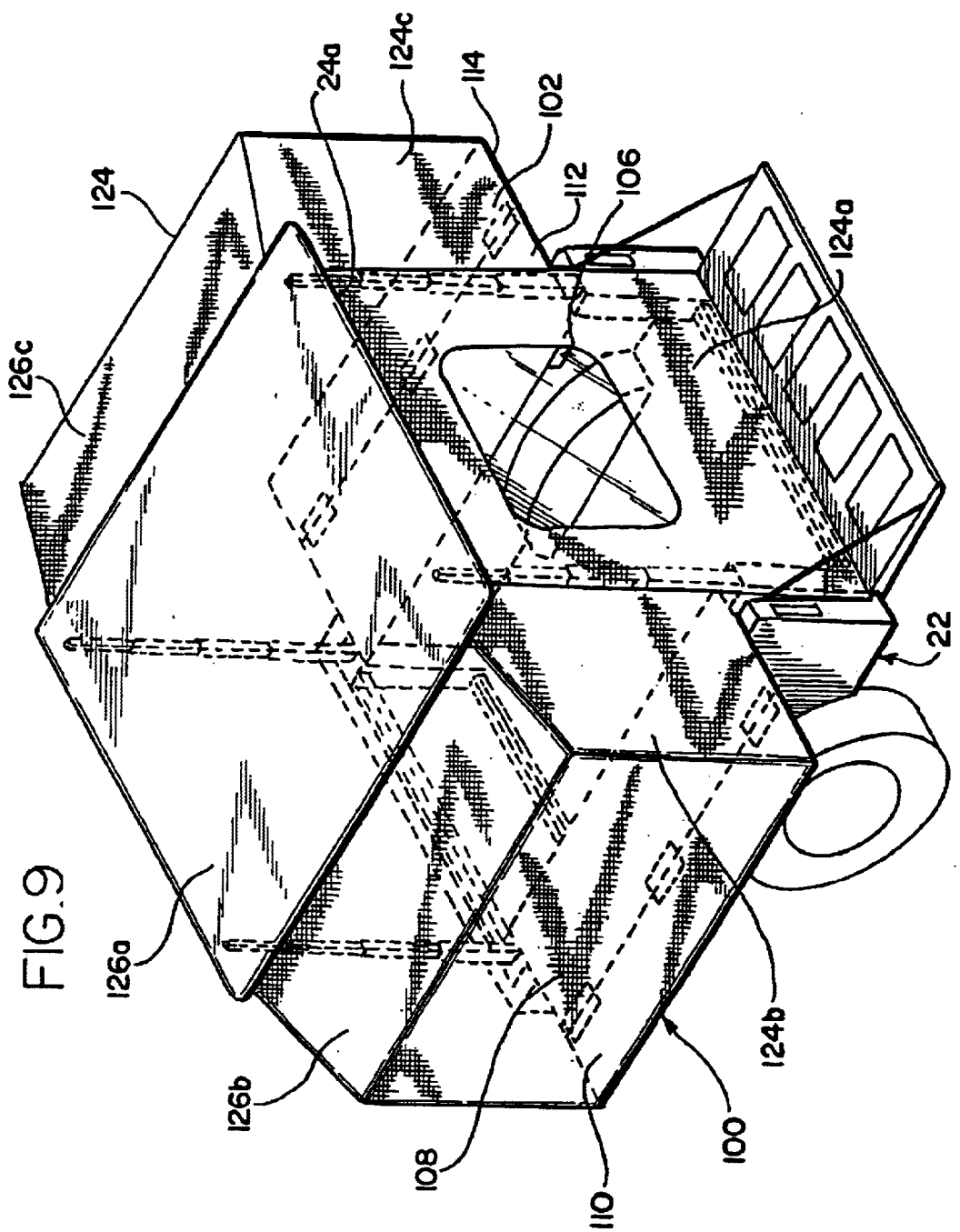

FOLD-OUT CAMPER FOR A PICK-UP TRUCK

RELATED APPLICATION

This application claims the benefit of U.S. Provisional Patent Application Ser. No. 60/355,364 filed Feb. 7, 2002.

BACKGROUND OF THE INVENTION

The present invention relates to a fold-out camper to be mounted in the bed of a pickup truck.

Although many different styles of fold-out or collapsible campers have been designed for use with pick-up trucks, these designs present several disadvantages. For example, many of these campers, when retracted, extend beyond the bed of the truck and therefore affect the aesthetic appearance and aerodynamic qualities of the truck when the camper is not in use. Other campers, when retracted, obstruct access to the bed of the truck, preventing the truck from being used to transport other items when the camper is mounted in the truck bed. Another disadvantage of currently used campers is that the truck bed must be modified in order to mount the camper within the bed.

The present invention provides a fold-out camper which overcomes the disadvantages of prior art campers and presents additional improvements.

OBJECTS AND SUMMARY OF THE INVENTION

A general object of the present invention is to provide a camper for use with a pick-up truck wherein the camper is stored within the bed of the pick-up truck.

Another object of the present invention is to provide a camper for use with a pick-up truck which does not obstruct access to the bed of the pick-up truck.

Yet another object of the present invention is to provide an expandable and retractable camper for use with a pick-up truck which does not significantly reduce the cargo area of the pick-up truck when the camper is retracted.

A further object of the present invention is to provide an expandable and retractable camper for use with a pick-up truck which does not affect the appearance of the pick-up truck when the camper is retracted.

Another object of the present invention is to provide a camper for use with a pick-up truck which does not require modifications to the pick-up truck.

Another object of the present invention is to provide a camper for use with a pick-up truck which can increase the height of the cargo area of the pick-up truck.

Another object of the present invention is to provide an expandable and retractable camper for use with a pick-up truck which does not affect the aerodynamic features of the pick-up truck when the camper is retracted.

Another object of the present invention is to provide a camper for use with a pick-up truck which can be easily mounted in and dismounted from the bed of the pick-up truck.

Briefly, and in accordance with the forgoing, a camper is provided which can be contained and stored within the bed of a pick-up truck. The camper is supported by a frame which is mounted in the bed of the pick-up truck. The frame is mounted near the perimeter of the pick-up truck bed and over the wheel wells. The camper can be expanded to provide shelter and additional workspace. The camper can be retracted within the bed of the pick-up truck for storage and transportation.

A conventional cover is used as the roof of the camper. When the camper is retracted, the camper is entirely concealed within the bed of the pick-up truck. The camper does not significantly impact the cargo area available for transporting item in the pick-up bed. When extended, the camper provides convenient shelter for camping or working, for example.

With the camper partially extended, the height of the cargo area is increased for the transportation of larger items. In addition, the roof of the camper, in connection with the roof of the pick-up truck, can be used for transporting items which are too long to fit within the cargo area of the pick-up truck bed.

The camper can be easily mounted in or dismounted from the bed of the pick-up without requiring any modifications to the pick-up truck. In addition, the camper does not require use of the side walls of the truck bed for support.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 9 is a perspective view of the camper in a fully extended position with some hidden elements shown in broken lines.

DETAILED DESCRIPTION OF THE ILLUSTRATED EMBODIMENT

Figure 1:
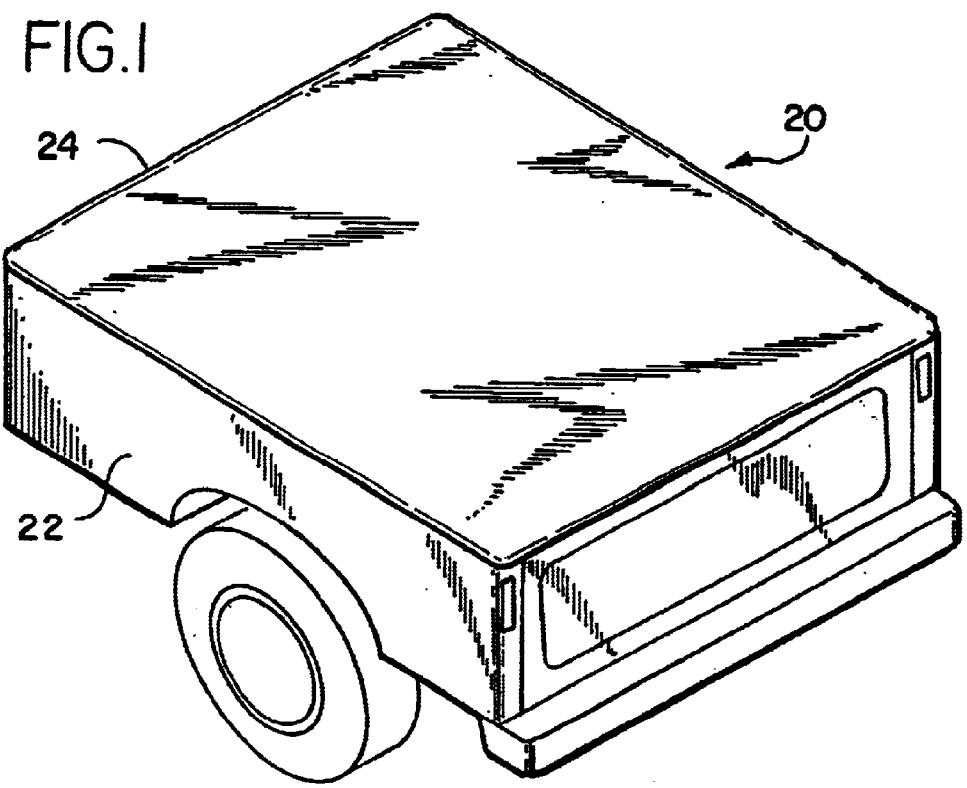
FIG. 1 is a perspective view of a camper which incorporates the features of the invention, such camper mounted in the bed of a pick-up truck and shown in its retracted form.

While the invention may be susceptible to embodiment in different forms, there is shown in the drawings, and herein will be described in detail, a specific embodiment with the understanding that the present disclosure is to be considered an exemplification of the principles of the invention, an is not intended to limit the invention to that as illustrated and described herein.

The camper 20 of the present invention is designed to be mounted in a bed 22 of a conventional pick-up truck. A conventional pick-up bed cover 24 serves as the roof of the camper 20 as will be described more fully below. The camper is capable of being expanded or retracted relative to the pick-up truck. As shown in FIG. 1, when not in use, the camper 20 can be folded and contained within the walls of the bed 22 of the pick-up truck and beneath the cover/roof 24 of the pick-up truck. Because the camper 20 is contained within the bed 22 of the pick-up truck when it is not in use, the camper 20 does not impact the outward appearance of the pick-up truck. In addition to the aesthetically pleasing appearance of the camper 20, the aerodynamic nature of the vehicle is not affected by the camper 20.

Figure 2:
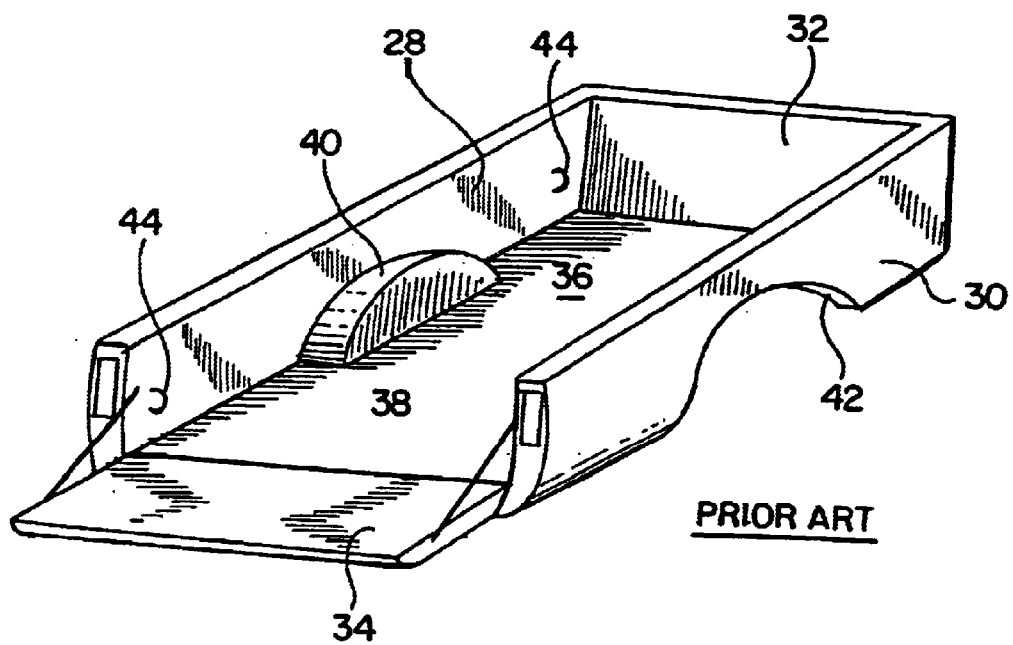
FIG. 2 is a perspective view of the bed of a typical pick-up truck.

As shown in FIG. 2, the bed 22 of the pick-up truck is conventional and made in accordance with the prior art. The bed 22 of the pick-up truck includes a left (driver side) wall 28, a right (passenger side) wall 30, a front wall 32, a tail gate 34, and a bottom wall 36. The tail gate 34 is hingedly connected to the bottom wall 36 and can be positioned vertically in a closed position or horizontally in an open position (as shown). When the tail gate 34 is in the closed positioned, the tail gate 34, left wall 28, right wall 30, front wall 32 and bottom wall 36, define a cargo area 38 in which items can be stored and transported. A left wheel well 40 extends from the left wall 28 into the cargo area 38. A right wheel well 42 extends from the right wall 30 into the cargo area 38. In the bed 22, eyelets 44 (two of which are shown) are fixed to the left wall 28 and right wall 30 of the bed 22. The eyelets 44 (two of which are shown) are typically used to secure tie downs (not shown) which are used to secure items to be transported within the cargo area 38 of the bed 22.

Figure 3:
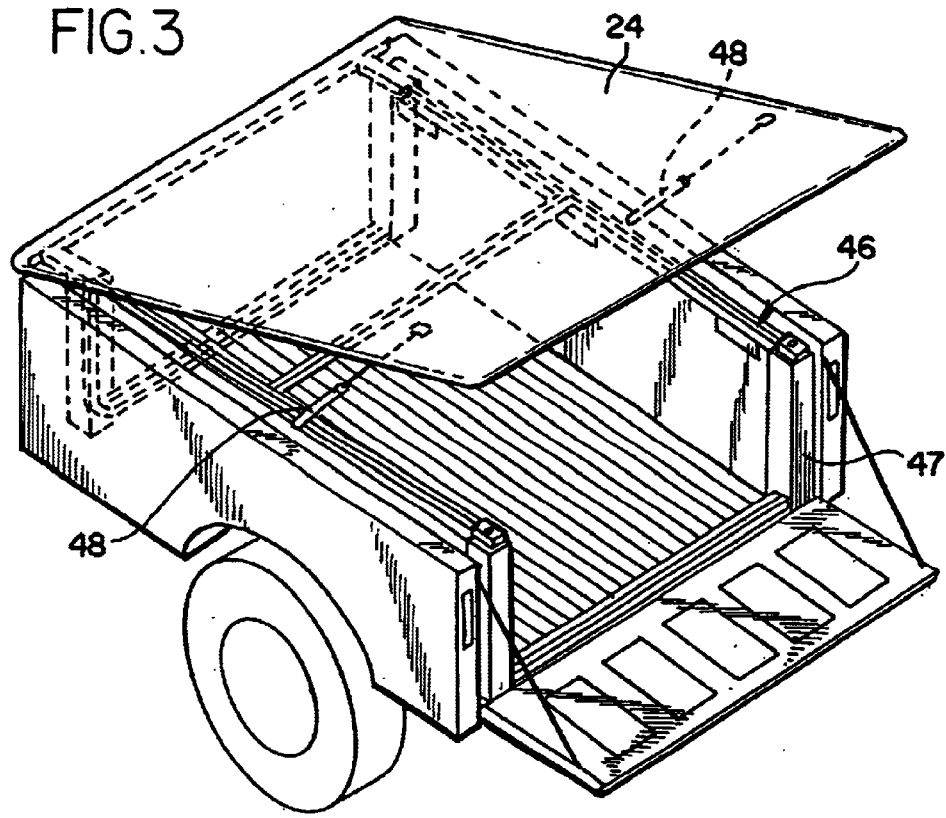
FIG. 3 is a perspective view of the camper of FIG. 1 in its retracted form mounted within the bed of the pick-up truck and with the cover of the pick-up truck raised and the tail gate of the pick-up truck lowered and with some hidden elements shown in broken lines.

As shown in FIG. 3, the camper 20 is shown in its retracted condition and is contained within the cargo area of a pick-up truck. The camper 20 includes an upper frame 46 and a lower frame 47. The cover 24 is hingedly attached to the upper frame 46 proximate the front end of the cargo area. Lift cylinders 48 are provided between the upper frame 46 and the cover 24 to raise and lower the cover 24 in a conventional manner. Raising the cover 24 provides access to the cargo area of the pick-up truck. As shown, the camper 20 retracts in a compact manner, leaving essentially all of the cargo area available for transportation of items. Because essentially all of the cargo area is available for the transportation of items, the camper 20 can be stored in the bed 22 of the pick-up truck while still allowing for the use of the bed 22 of the pick-up truck.

Figure 4:
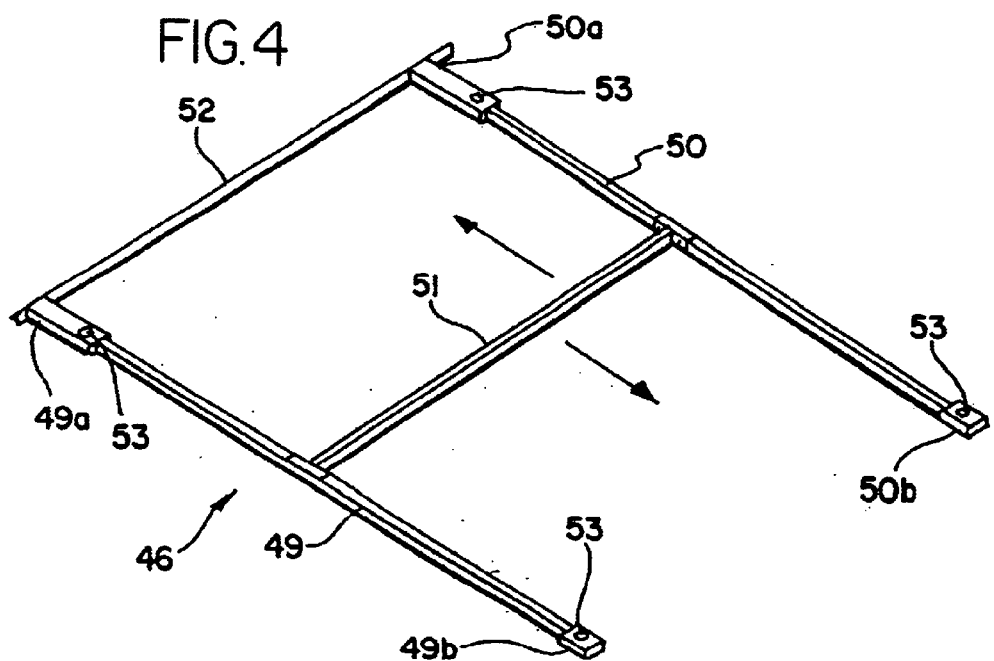
FIG. 4 is a perspective view of the upper frame of the camper of FIG. 1.

As shown in FIG. 4, the upper frame 46 includes a left rail 49, a right rail 50, a moveable brace 51 and an elongated L-shaped attachment bracket 52. The left rail 49 has a front end 49a and a rear end 49b. The right rail 50 has a front end 50a and a rear end 50b. The front ends 49a, 50a of the left rail 49 and the right rail 50 are joined by the attachment bracket 52. The left rail 49 and the right rail 50 are parallel to each other and the attachment bracket 52 is perpendicular to the left rail 49 and the right rail 50. The moveable brace 51 is slidably mounted between the left rail 49 and the right rail 50. The moveable brace 51 can be positioned between the front ends 49a, 50a of the rails 49, 50 and the rear ends 49b, 50b of the rails 49, 50. The moveable brace 51 can be positioned proximate the rear ends 49b, 50b of the rails 49, 50 to provide support at the rear of the upper frame 46 but can also be slid to toward the front of the bed 22 to allow easier access to the bed 22 as will be described herein. Alternatively, the moveable brace 51 can be eliminated from the upper frame 46.

Fasteners 53 are provided on the left and right rails 49, 50 for attachment to the legs of the camper 20 as will be described herein. The cover 24 is hingedly attached to the attachment bracket 52 of upper frame 46. As shown in FIG. 3, the cover 24 can be raised and lowered by pivoting to obtain access to the cargo area of the pick-up truck. When the cover 24 is lowered and the tail gate is closed, the perimeter of the cover 24 rests on the left wall 28, the right wall 30, the front wall 32 and the tail gate 34.

A latch (not shown) can also be provided on the upper frame 46 for further securing the cover 24 to the upper frame 46 when the cover 24 is in the closed position.

Figure 5:
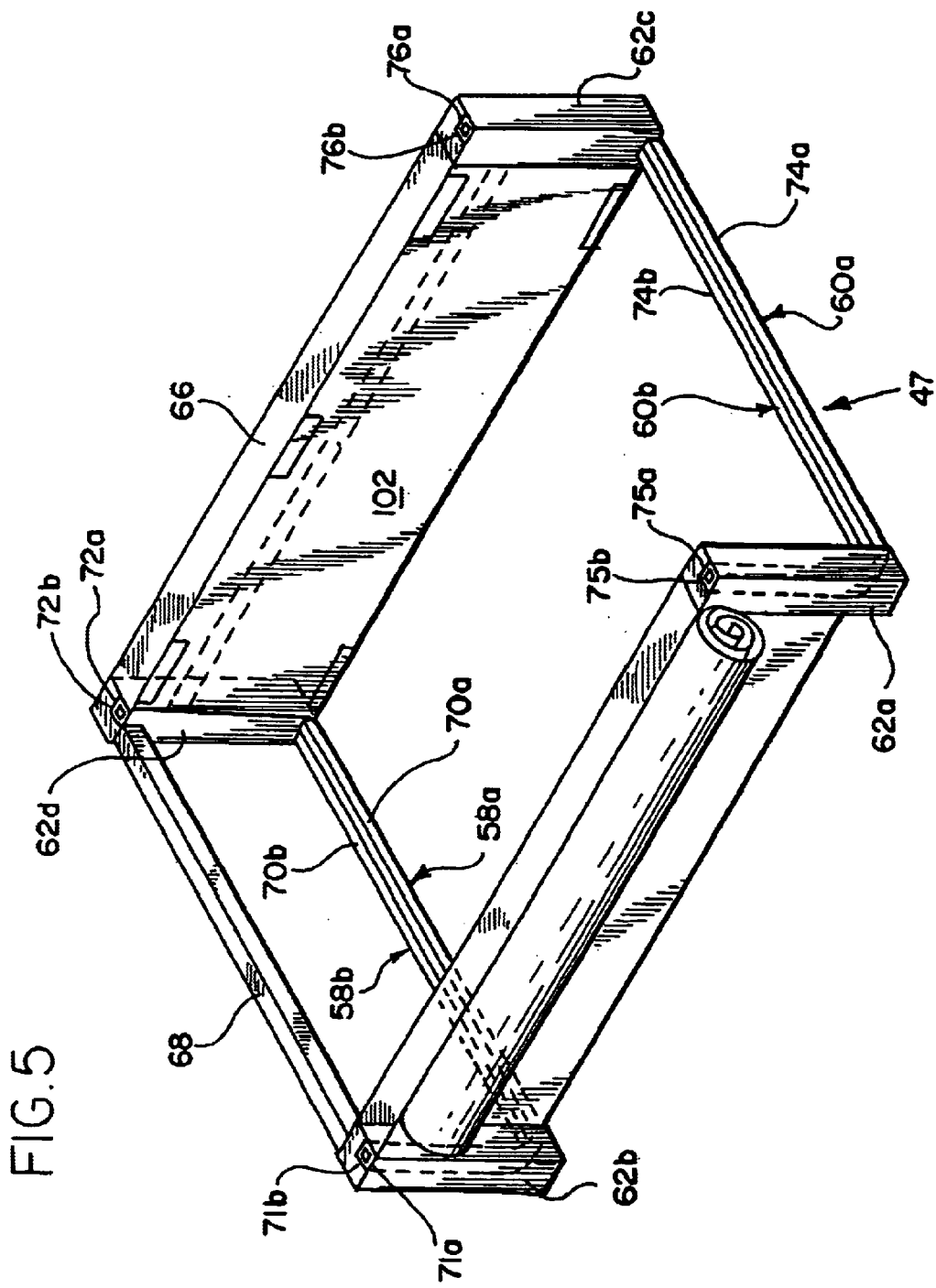
FIG. 5 is a perspective view of the lower frame of the camper of FIG. 1 with some hidden elements shown with broken lines.

The lower frame 47 of the camper 20 is shown in FIG. 5. The lower frame 47 can be permanently fixed to the bed 22, by welding, for example or the frame 57 can be removably mounted to the bed 2, using bolts, for example. Alternatively, the frame 47 can be attached to the bed 22 using suitable means attached to the eyelets 44. By using the eyelets 44 to mount the frame 47 within the bed 22, the bed 22 is not modified. Thus, the camper 20 can be mounted in and dismounted from the pick-up truck without modification to the pick-up truck.

The lower frame 47 is generally rectangularly shaped and is constructed from channels or tubing of suitable material, such as, for example, steel, aluminum, plastic or a combination these materials. The lower frame 47 includes two generally U-shaped front rails 58a, 58b, two generally U-shaped rear rails 60a, 60b, four corner posts 62a, 62b, 62c, 62d, a left rail 64, a right rail 66 and a front end support 68.

Each corner post 62a, 62b, 62c, 62d has a square cross-section and extends vertically from the bottom wall 36 of the bed 22. Although the corner posts 62a, 62b, 62c, 62d are shown with a square cross-section, posts of any shape can be used. The height of each corner post 62a, 62b, 62c, 62d is substantially equal to the depth of the bed 22. A lower end of each post 62a, 62b, 62c, 62d rests on the bottom wall 36 of the bed 22. An upper end of each post 62a, 62b, 62c, 62d is substantially aligned with a top surface of the left wall 28, the right wall 30, the front wall 32, and the tail gate 34. Corner post 62a is positioned near the left wall 28 and the tail gate 34. Corner post 62b is positioned near the left wall 28 and the front wall 32. Corner post 62c is positioned near the right wall 30 and the tail gate 34. Corner post 62d is positioned near the right wall 30 and the front wall 32. When the lower frame 47 is mounted in the bed 22, corner post 62a is positioned in front of the tailgate 34 and rearward of the left wheel well 40, corner post 62b is positioned to the rear of the front end 32 and in front of the left wheel well 40, corner post 62c is positioned in front of the tailgate 34 and rearward of the right wheel well 42, and corner post 62d is positioned to the rear of the front end 32 and in front of the right wheel well 42. When mounted in the bed 22, the posts 62a, 62b are proximate the left wall 28 of the bed 22 and extend into the cargo area 38. The inner surfaces of the posts 62a, 62b are approximately aligned with the inner surface of the left wheel well 40. The posts 62c, 62d are proximate the right wall 30 of the bed 22 and extend into the cargo area 38. The inner surfaces of the posts 62c, 62d are approximately aligned with the right wheel well 42.

The front rails 58a, 58b are preferably constructed from a rigid tubing. The front rails 58a, 58b are positioned proximate one another near the front wall 32 of the bed 22. The front rail 58a includes a base portion 70a, a first leg 71a which is perpendicular to the base portion 70a and connected to one end thereof and a second leg 72a which is perpendicular to the base portion 70*a* and connected to the opposite end thereof. The base portion 70*a* rests on the bottom wall 36 of the bed 22. The first leg 71*a* extends through the post 62*b* and the second leg 72*a* extends through post 62*d*. The front rail 58*b* includes a base portion 70*b*, a first leg 71*b* which is perpendicular to the base portion 70*b* and connected to one end thereof and a second leg 72*b* which is perpendicular to the base portion 70*b* and connected to the opposite end thereof. The base portion 70*b* rests on the bottom wall 36 of the bed 22. The first leg 71*b* extends through the post 62*b* and the second leg 72*b* extends through post 62*d*.

The rear rails 60*a*, 60*b* are preferably constructed from a rigid tubing. The rear rail 60*a* is positioned near the tail gate 34. The rear rail 60*a* includes a base portion 74*a*, a first leg 75*a* which is perpendicular to the base portion 74*a* and connected to one end thereof, and a second leg 76*a* which is perpendicular to the base portion 74*a* and connected to the opposite end thereof. The first leg 75*a* of the rear rail 60*a* extends through post 62*a*, and a second leg 76*a* of the rear rail 60*a* extends through post 62*c*. The rear rail 60*b* is positioned near the rear rail 60*a*. The rear rail 60*b* includes a base portion 74*b*, a first leg 75*b* which is perpendicular to the base portion 74*b* and connected to one end thereof, and a second leg 76*b* which is perpendicular to the base portion 74*b* and connected to the opposite end thereof. The first leg 75*b* of the rear rail 60*b* extends through post 62*a*, and the second leg 76*b* of the rear rail 60*b* extends through post 62*c*.

The front rails 58*a*, 58*b* are secured to the corner posts 62*b*, 62*d* and the rear rails 60*a*, 60*b* are secured to the corner posts 62*a*, 62*c* preferably through the use of bolts. The front rails 58*a*, 58*b* and the rear rails 60*a*, 60*b* provide additional support for the lower frame 47. In addition, the front rails 58*a*, 58*b* and the rear rails 60*a*, 60*b* can be used to house components of a lifting mechanism as will be described below. Alternatively, a single front rail could be provided along with a single rear rail. In yet another alternative, the front rail and the rear rails could be eliminated from the lower frame member 47.

The left rail 64 is positioned near the left wall 28 and extends between the upper ends of post 62*a* and post 62*b*. The left rail 64 is positioned above the left wheel well 40 and extends from the left wall 28 into the cargo area. The width of the left rail 64 is such that the inner surface of the left rail 64 is approximately aligned with the inner surface of the left wheel well 40. The upper surface of the left rail 64 is at approximately the same height as the upper surface of the left wall 28 of the bed 22.

The right rail 66 is positioned near the right wall 30 and extends between the upper ends of post 62*c* and post 62*d*. The right rail 66 is positioned above the right wheel well 42 and extends from the right wall 30 into the cargo area. The width of the right rail 66 is such that the inner surface of the right rail 66 is approximately aligned with the inner surface of the right wheel well 42. The upper surface of the right rail 66 is at approximately the same height as the upper surface of the right wall 30 of the bed 22.

The end support 68 is positioned near the front wall 32 and extends between the upper ends of the post 62*b* and post 62*d*. The upper surface of the end support 68 is at approximately the same height as the upper surface of the front wall 32.

Figure 6:
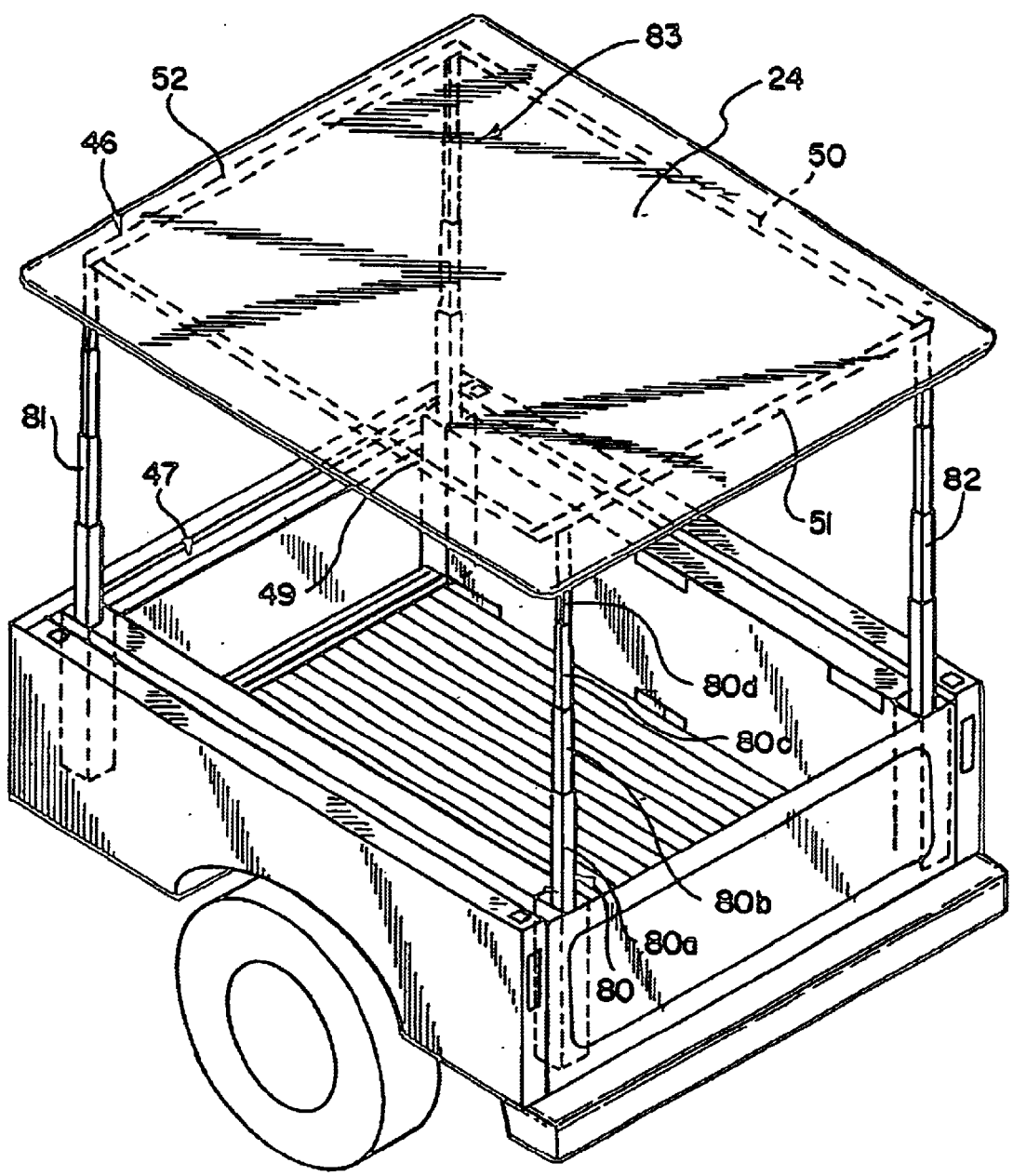
FIG. 6 is a perspective view of the camper mounted within the bed of the pick-up truck and partially extended with some hidden elements shown in broken lines.

As shown in FIG. 6, four telescoping legs 80, 81, 82, 83 are mounted within the respective corner posts 62*a*, 62*b*, 62*c*, 62*d*. Telescoping leg 80 includes a first portion 80*a*, a second portion 80*b*, a third portion 80*c*, and a fourth portion 80*d*. Each portion 80*a*, 80*b*, 80*c*, 80*d* is approximately equal in length. The inner perimeter of post 62*a* is larger than the outer perimeter of portion 80*a*. The inner perimeter of portion 80*a* is larger than the outer perimeter of portion 80*b*. The inner perimeter of portion 80*b* is larger than the outer perimeter of portion 80*c*. The inner perimeter of portion 80*c* is larger than the outer perimeter of portion 80*d*. The successively smaller perimeter portions, allow the portions 80*a*, 80*b*, 80*c*, 80*d* to nest within each other and within post 62*b* when retracted. The leg 80 extends to a length of approximately 40 inches above first portion 80*a*. The remaining telescoping legs 81, 82, 83 are constructed in a manner similar to the construction of leg 80.

When in a retracted position, the telescoping leg 80 is positioned within the corner post 62*a* and the first legs 75*a*, 75*b* of the rear rails 60*a*, 60*b* are positioned within the corner post 62*a*. When in a retracted position, the telescoping leg 81 is positioned within the corner post 62*b* and the first legs 71*a*, 71*b* of the front rails 58*a*, 58*b* are positioned within the corner post 62*b*. When in a retracted position the telescoping leg 82 is positioned within corner post 62*c* and the second legs 76*a*, 76*b* of the rear rails 60*a*, 60*b* are positioned within the corner post 62*c*. When in a retracted position the telescoping leg 83 is positioned within corner post 62*d* and the second legs 72*a*, 72*b* of the front rails 58*a*, 58*b* are positioned within the corner post 62*d*. The first portions of the legs 80, 81, 82, 83 are attached to the upper frame 46 using the fasteners 53.

A conventional extension system (not shown) is provided to extend the telescoping legs 80, 81, 82, 83 thereby lifting the cover 24. Portions of the extension system, such as, for example, cables, pulleys, screw drives, electric motors, steel push springs, etc. can be contained within the components of the lower frame 47 or under the bed 22 of the pick-up truck. If the front rails 58*a*, 58*b* and the rear rails 60*a*, 60*b* are not needed to house components of the lifting mechanism, the front rails and the rear rails can be eliminated from the lower frame 47.

Figure 7:
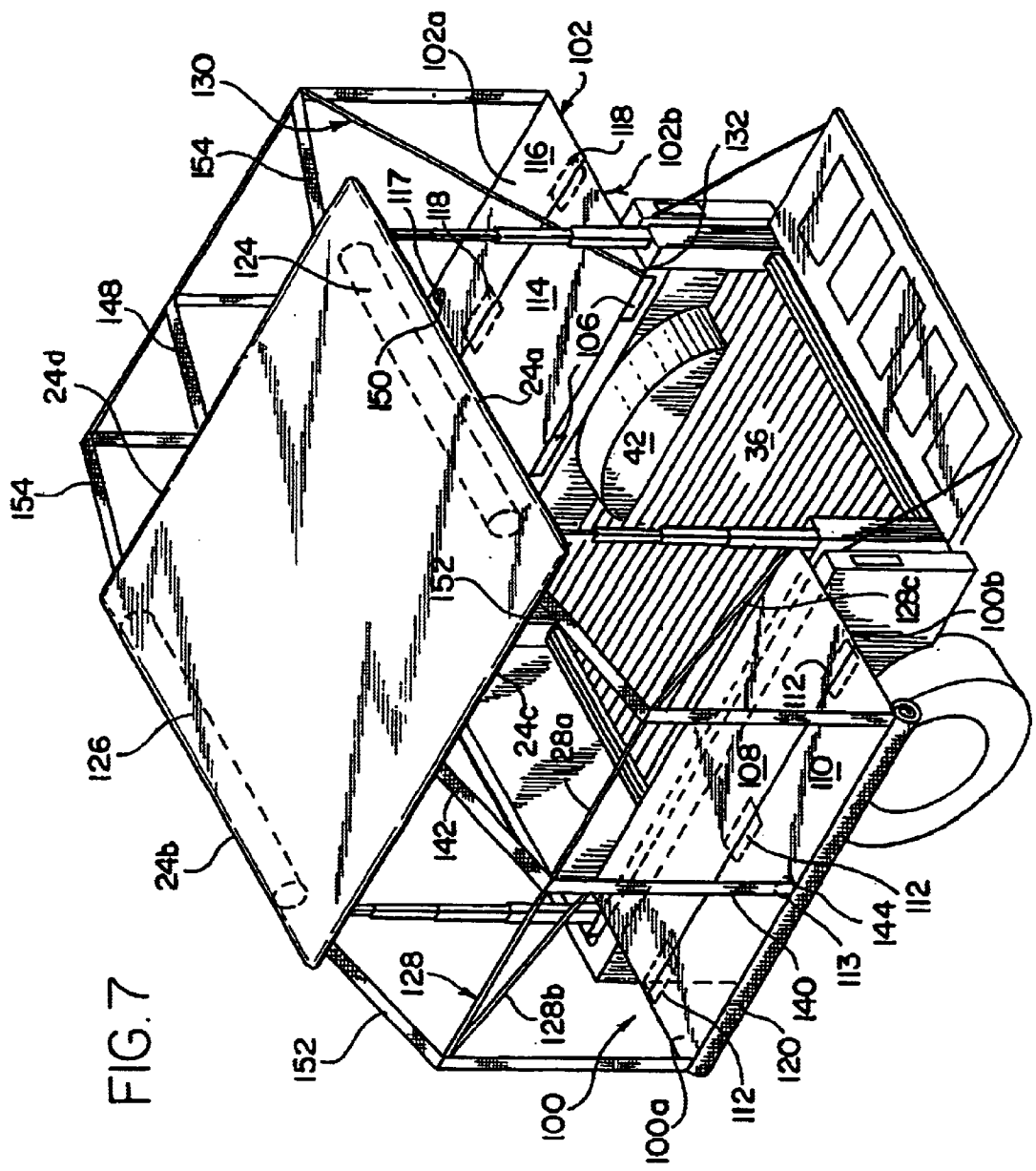
FIG. 7 is a perspective view of the camper in a further extended condition and mounted in the bed of a pick-up truck with some hidden elements shown in broken lines.

The camper 20 is shown in a partially expanded position in FIG. 7. The camper 20 includes a left bed 100 and a right bed 102. The left bed 100 has a top surface 100*a* and a bottom surface 100*b*. The right bed 102 has a top surface 102*a* and a bottom surface 102*b*. The left and right beds 100, 102 can be used for sleeping, sitting or storage of cargo and are made from rigid material such as plywood or a composite panel (two thin skins with a core therebetween).

Figure 8A:
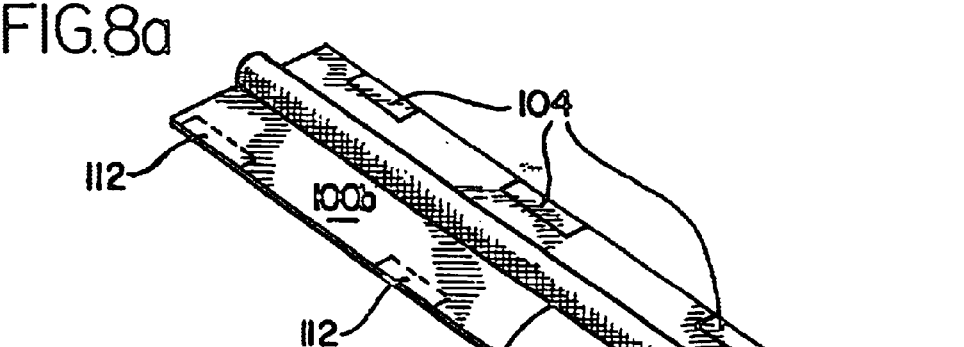
FIG. 8 is a series of perspective views of one of the beds of the camper with some hidden elements shown in broken lines.
Figure 8B:
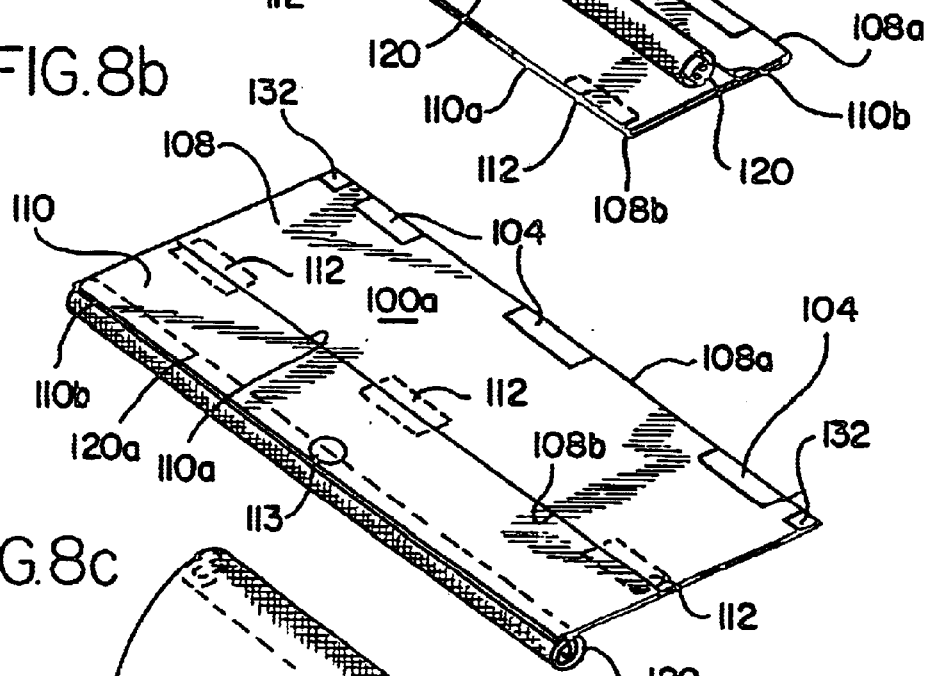
Figure 8C:
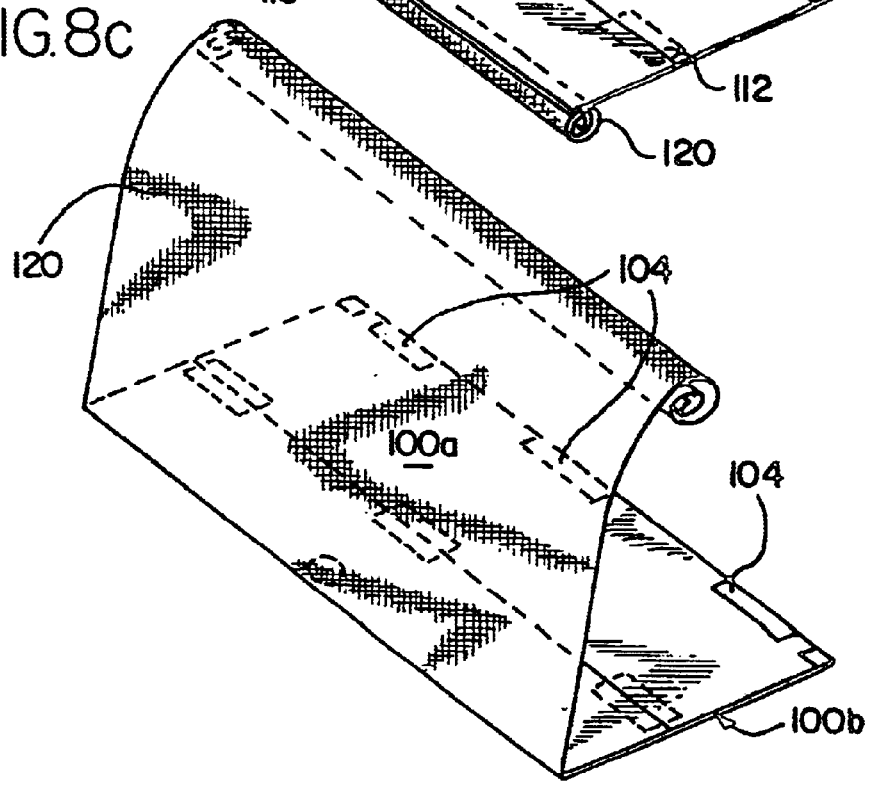

The left bed 100 includes a first panel 108 and a second panel 110. As shown in FIGS. 8*a*–8*c*, the first panel 108 includes a fixed end 108*a* and a free end 108*b*. The second panel 110 includes a fixed end 110*a* and a free end 110*b*. The fixed end 108*a* of the first panel 108 is attached to the left rail 64 by hinges 104. The fixed end 110*a* of the second panel 110 is attached to the free end 108*b* of the first panel 108 by hinges 112. An aperture 113 is provided proximate the free end 110*b* of the second panel 110 for reasons described herein.

The right bed 102 includes a first panel 114 and second panel 116. The first panel 114 includes a fixed end 114*a* and a free end 114*b*. The second panel 116 includes a fixed end 116*a* and a free end 116*b*. The fixed end 114*a* of the first panel 114 is attached to the right rail 66 by hinges 106. The fixed end 116*a* of the second panel 116 is attached to the free end 114*b* of the first panel 114 by hinges 118. An aperture 117 is provided proximate the free end 116*b* of the second panel 116 for reasons described herein.

A left tent wall 120, a right tent wall 122, a rear tent wall 24 and a front tent wall 126 are provided to enclose the camper 20. The tent walls 120, 122, 124, 126 can be constructed from canvas, nylon or any material which is suitable for protection from the elements. When the camper 20 is retracted, the walls 120, 122, 124, 126 are rolled for easy storage. Alternatively, the tent walls 120, 122, 124, 126 can be eliminated and the camper can be used without tent walls as will be described herein.

The left tent wall 120 is rectangularly shaped. The width of the left tent wall 120 is approximately equal to the width of the left bed 100. The length of the left tent wall 120 is greater than the distance between the free end 110b of the second panel of the left bed 100 and a left edge 24c of the roof 24 when the telescoping legs 80, 81, 82, 83, are fully extended and the bed 100 is fully extended. A first edge 120a (see FIG. 8b) of the left tent wall 120 is secured to the bottom surface 100b of the second panel 110 of the left bed 100 by suitable means such as, for example, snaps or hook and loop type fasteners. The remainder of the left tent wall 120 is rolled and secured to the bottom surface 100b of the bed 100 by suitable means such as, for example, ties, snaps, or hook and loop type fasteners.

The right tent wall 122 is rectangularly shaped. The width of the right tent wall 122 is approximately equal to the width of the right bed 102. The length of the right tent wall 122 is greater than the distance between the free end 116b of the second panel 116 of the right bed 102 and the right edge 24d of the roof 24 when the telescoping legs 80, 81, 82, 83 are fully extended and the right bed 102 is fully extended. A first edge 122a of the right tent wall 122 is secured to the bottom surface 102b of the second panel 116 of the right bed 102. The remainder of the right tent wall 122 is rolled and secured to the bottom surface of the bed 102b by suitable means such as, for example, ties, snaps, or hook and loop type fasteners.

The rear tent wall 124 includes a rectangularly shaped center portion 124a, a left wing 124b and a right wing 124c. A first edge of the center portion 124a of the rear tent wall 124 can be secured to bottom surface of the cover 24 near a rear edge 24a of the cover 24. The left wing 124b and the right wing 124 are folded onto the center portion 124a and the rear tent wall 124 is rolled and secured to the bottom surface of the cover 24 by suitable means.

The front tent wall 126 includes a rectangularly shaped center portion 126a, a left wing 126b and a right wing 126c. A first edge of the center portion 126a of the front tent wall 126 can be secured to a bottom surface of the cover 24 near a front edge 24b of the cover 24. The left wing 126b and the right wing 126c are folded onto the center portion 126a and the front tent wall 126 is rolled and secured to the bottom surface of the cover 24 by suitable means.

The left wing 124b and the right wing 124c of the rear wall 124 have been described as portions of the rear wall 124. Similarly the left wing 126b and the right wing 126c have been described as portions of the front tent wall 126. Alternatively, however, the left and right wing portions could be made as portions of the left tent wall 120 and the right tent wall 122.

Left and right tent supports 128, 130 are constructed from collapsible tent poles, such as those commonly used to support a tent. Left and right tent supports 128, 130 extend from the left and right beds 100, 102 respectively and are used to support the left and right tent walls 120, 122 as will be described herein below. The left tent support 128 is generally U-shaped and includes a base portion 128a and two leg portions 128b, 128c which extend from opposite ends of the base portion 128a. The free ends of each leg portion 128b, 128c are positioned within recesses (not shown) in the left bed 100. Alternatively, the left tent support 128 can extend from post 62a and post 62b. The right tent support 130 is also generally U-shaped and includes a base portion 130a and two leg portions 130b, 130c which extend from opposite ends of the base portion 130a. The free ends of each leg portion 130b, 130c are positioned within recesses 132 in the right bed 102. Alternatively, the right tent support 130 can extend from post 62c and post 62d.

Left bed support 140 includes a nylon strap 142 and a pin 144. A first end of the strap 142 is attached to the left rail 49 of the upper frame 46. The pin 144 is attached to the opposite/free end of the strap 142. The length of the pin 144 is greater than the diameter of the aperture 113.

A right bed support 146 includes a nylon strap 148 and a pin 150. A first end of the strap 148 is attached to the right rail 50 of the upper frame 46. The pin 150 is attached to the opposite/free end of the strap 148. The length of the pin 150 is greater than the diameter of the aperture 117.

Webbing 152 is provided on the rearward and forward ends of the left bed 100 to provide further support for the left bed 100. The webbing 152 is attached to the left rail 49 of the upper frame 46 and is secured to the outer edge of the bed 100 at the rearward and forward ends. Webbing 154 is provided on the rearward and forward ends of the right bed 102 to provide further support of for the right bed 102. The webbing 154 is attached to the right rail 50 of the upper frame 46 and is secured to the outer edge of the right bed 102 at the rearward and forward ends. Any number of suitable methods can be used to attach the webbing 152, 154 to the upper frame 46 and the beds 100, 102. Tightening buckles (not shown) can be placed on the webbing 152, 154 in order to adjust the length of the webbing 152, 154 and thus the amount of support provided to the beds 100, 102.

The webbing 152, 154 can be used in connection with the left bed support 140 and the right bed support 142 or without the left bed support 140 and right bed support 142. Alternatively, left bed support 140 and right bed support 142 can be used without the webbing 152, 154.

Now that the structure of the camper 20 has been described, use of the camper 20 will now be described. The camper 20 is mounted in the bed 22 by lowering the tail gate 34 to its horizontal or open position and lifting the camper 20 into the bed 22. The front posts 62b, 62d are lifted over the respective left and right wheel wells 40, 42 and positioned proximate the front wall 32. The rear posts 62a, 62c are positioned to the rear of the respective left and right wheel wells 40, 42 and proximate the tail gate 34. The left and right beds 100, 102 are then lifted to obtain access to the eyelets 44 of the pick-up truck bed. Mounting straps or other suitable means are secured to the eyelets 44 and to eyelets (not shown) on the lower frame 47 to secure the camper 20 within the bed 22 of the truck. Alternatively, the camper 20 can be secured to the bed using bolts, welding or other suitable means. The roof 24 is then attached to the attachment bracket 52 of the upper frame 46 and the lift cylinders 48 are then mounted between the roof 24 and the left and right rails 48, 49 of the upper frame 46. The roof 24 is then lowered and latched to the upper frame 46 and the tail gate 34 is closed. The camper 20 can now be transported to the desired location for use.

Once the camper 20 has been transported to the desired location, the camper 20 can be extended for use. The user begins by opening the tail gate 34 so that it is in the horizontal position. The user then activates the extension system to extend the telescoping legs 80, 81, 82, 83 and to lift the cover 24 and the upper frame 46. Once the legs 80, 81, 82, 83 are extended the user can stand in the cargo area 38 of the bed 22 to extend the beds 100, 102.

Operation of the left bed 100 is shown in FIGS. 8a–8c. Extension of the left bed 100 begins by lifting the bed 100 and rotating it about the hinges 104 which form an axis of rotation parallel to the left wall of the bed 22. The bed 100 is rotated 270 degrees counter-clockwise from a perspective rear of the pick-up truck, as shown in FIG. 8a. In this position, the first panel 108 rests on the left side frame 64 and extends over and beyond the left side wall 28 of the pick-up truck. Next, the second panel 110 is rotated about the hinges 112 which also form an axis of rotation parallel to the left wall 22 of the bed 22. The second panel 110 is rotated 180 degrees clockwise from a perspective rear of the pick-up truck, as shown in FIG. 8b, so that the first panel 108 and the second panel 110 are adjacent to one another and the bed 100 is fully extended.

The fasteners securing the rolled left tent wall 120 are then released. While the first edge of the tent wall 120 remains secured to the bottom surface 100b of the bed 100, the remainder of the left tent wall 120 is unrolled. The second edge of the left tent wall 120 is attached to the bottom surface of the cover 24 or to left side 49 the upper frame 26 using suitable means, such as, for example, snaps or hook and loop type fasteners.

Operation of the right bed 102 is similar to the operation of the left bed 100. Extension of the right bed 102 begins by lifting the bed 102 and rotating it about the hinges 106 which form an axis of rotation parallel to the right wall 30 of the bed 22 of the pick-up truck. The bed 102 is rotated 270 degrees clockwise from a perspective rear of the pick-up truck. In this position the first panel 114 rests on the right side frame 66 and extends over and beyond the right wall 30 of the pick-up truck. Next, the second panel 116 is rotated about the hinges 118 which also form an axis of rotation parallel to the right wall 30 of the bed of the pick-up truck. The second panel 116 is rotated 180 degrees so that the first panel 114 and the second panel 116 are adjacent one another and the bed 102 is fully extended.

The fasteners securing the rolled right tent wall 122 are then released. While the first edge of the tent wall 122 remains secured to the bottom surface 102b of the bed 102, the remainder of the right tent wall 122 is unrolled. The second edge of the right tent wall 122 is attached to the bottom surface of the cover 24 or to the right side of the upper frame 46 using suitable means, such as, for example snaps or hook and loop type fasteners.

The fully extended camper 20 is shown in FIG. 9. Extension of the camper 20 continues by releasing the fasteners securing the left bed support 140. While the first end of the strap 142 remains secured to the left side 49 of the upper frame 46, the remainder of the strap 142 is unrolled. The second panel 110 of the left bed 100 is rotated slightly, the pin 144 is held in a vertical position and passed through the aperture 113 in the bed 100. The pin 144 is then allowed to rotate to a horizontal position as the bed 100 is released and allowed to fully extend. The pin 144 engages the bottom surface 100b of the bed 100. Because the pin 144 is longer than the diameter of the aperture 113, the pin does not pass through the aperture 113 while engaged with the bottom surface 100b of the bed 100.

The fasteners securing the right bed support 146 are released. While the first end of the strap 148 remains secured to the right side 50 of the upper frame 46, the remainder of the strap 148 is unrolled. The second panel 116 of the right bed 102 is rotated slightly, the pin 150 is held in a vertical position and passed through the aperture 117 in the bed 102. The pin 150 is then allowed to rotate to a horizontal position and the bed 102 is released and allowed to fully extend. The pin 150 engages the bottom surface 102b of the bed 102. Because the pin 150 is longer than the diameter of the aperture 117, the pin does not pass through the aperture 117 while engaged with the bottom surface 102b of the bed 102.

Left and right bed supports 144, 146 and left and right webbing 152, 154 operate to distribute the weight of the beds 100, 102 and the items or persons positioned on the bed 100, 102 to the, upper frame 46, the cover 24, legs 80, 81, 82, 83, the lower frame 47 and the bed 22. The fasteners securing the rolled front wall 126 are released. While the first edge of the front wall 126 remains secured to the bottom surface of the roof 24, the remainder of the front wall 126 is unrolled. The left wing portion 126b and the right wing portion 126c are then folded outward. The left wing portion 126b is joined to the left tent wall 120. Snaps, zippers, hook and loop fasteners or any other suitable method can be used to join the left wing portion 126b to the left tent wall 120. Similarly, the right wing portion 126c is joined to the right tent wall 122.

The fasteners securing the rolled rear wall 124 are released. While the first edge of the rear wall 124 remains secured to the bottom surface of the roof 24, the remainder of the rear wall 124 is unrolled. The left wing portion 124b and the right wing portion 124c are then folded outward. The left wing portion 124b is joined to the left tent wall 120 and the right wing portion is joined to the right tent wall 122. As shown in FIG. 9, the rear wall 124 includes a window portion 124d which is made from a flexible material which allows light into the camper 20 or allows a user to view outside of the camper 20. The window portion 124d can, for example, be made from a mesh fabric or from a clear plastic. In addition, a zipper is provided in the rear wall 124 to allow entry to and exit from the camper 20.

The left tent support 128 is placed against the interior surface of the left tent wall 120. The left wing 126b of the front tent wall 126, the left tent wall 120, and the left wing 124b of the rear tent wall 124 are then pushed outward extending the walls over and around the bed 100. The free ends of the tent support 128 are positioned within the recesses (not shown) to secure the tent support 128. The bottom edge of the left wing 126b of the front tent wall 126 is then secured to the bottom surface 100b of the bed 100 and the bottom edge of the left wing 124b of the rear tent wall 124 is secured to the bottom surface 100b of the bed 100.

The right tent support 130 is placed against the interior surface of the right tent wall 122. The right wing 126c of the front tent wall 126, the right tent wall 122 and the right wing 124c of the rear tent wall 124 are then pushed outward extending the walls over and around the bed 102. The free ends of the tent support 130 are positioned within the recesses 134 to secure the tent support 130. The bottom edge of the right wing 126c of the front tent wall 126 is secured to the bottom surface 102b of the right bed 102 and the bottom edge of right wing 124c of the rear tent wall 124 is secured to the bottom surface 102b of the right bed 102.

Rather than placing the left tent support 128 and the right tent support 130 against the interior surface of the left tent wall 120 and right tent wall 124 respectively, loops of fabric can be sewn into the interior surfaces of the left and right tent wall 120, 124. The base portion 128a of the left tent support 128 can be placed in the loops sewn to the interior surface of the left tent wall 120. The base portion of the right tent support 130 can be placed in the loops sewn to the interior surface of the right tent wall 124.

The extended camper provides convenient shelter and workspace. In the event the tent walls 120, 122, 124, 126 are not included, the camper can be used, for example, as an "open" concession stand.

To retract the camper 20, the free ends of the left and right tent supports 128, 130 are released from the respective recesses. The left and right tent supports 128, 130 are folded and can be placed near the wheel wells 40, 42 for storage. Alternatively, if loops have been sewn to the interior surfaces of the left and right tent walls 120, 122, the base portions of the left and right tent support can remain in the loops. The left wings 124b, 126b of the rear and front tent wall 124, 126 are detached from the bottom surface 100b of the left bed 100. The right wings 124c, 126c of the rear and front tent walls 124, 126 are detached from the bottom surface 102b of the right bed 102. The left wing 126b of the front wall 126 is detached from the left tent wall 120 and right wing 126c of the front wall 126 is detached from the right tent wall 122. The left wing 124b of the rear wall 124 is detached from the left tent wall 120 and the right wing 124c of the rear wall 124 is detached from the right tent wall 122.

Now that the tent walls have been detached, the walls 124, 126 can be folded, rolled and stored. The left and right wings 126b, 126c of the front tent wall 126 are folded inward and the front tent wall 126 is rolled beginning with the bottom edge of the front tent wall 126. The rolled front tent wall 126 can then be attached to the bottom surface of the cover 24 near the front edge 24b. The left and right wings 124b, 124c of the rear tent wall 124 are folded inward and the rear tent wall 124 is rolled beginning with the bottom edge of the rear tent wall 124. The rolled rear tent wall 124 can then be attached to the bottom surface of the cover 24 near the rear edge 24b.

The left tent wall 120 is detached from the bottom surface of the cover 24 or the left side 49 of the upper frame 46. The left tent wall 120 is rolled and then secured to the bottom surface 100b of the bed 100. The right tent wall 122 is detached from the bottom surface of the cover 24 or the right side 50 of the upper frame 46. The right tent wall 122 is rolled and then secured to the bottom surface 102b of the bed 102. If loops have been sewn to the interior surfaces of the left and right tent walls 120, 122, the base portions of the left and right tent supports 128, 130 can be rolled with the respective tent wall and secured to the bottom surface of the respective bed.

The pin 144 of the left bed support 140 is passed through the aperture 113 of the bed 100 and the strap 142 is rolled and secured to the bottom surface of the cover 24 or alternatively to the left side 49 of the upper frame 46. The webbing 152 is detached from the bed 100 and the webbing is rolled and secured to the bottom surface of the cover 24 or alternatively to the left side 49 of the upper frame 46. The second panel 110 of the left bed 100 is then rotated about the hinges 112 180 degrees clockwise so that is rests on the first panel 108. The first panel 108 is then rotated about the hinges 104 270 degrees clockwise so that the first panel 108 is generally parallel to the left wall 28 of the pick-up. In this folded and retracted position the second panel 110 will abut the left wheel well 40 and the first panel 108 will abut the second panel 110. The rolled left tent wall 120 will rest on top of the left wheel well 40. When retracted the bottom surface 100b of the first panel 108 will be substantially aligned with the inner surfaces of the posts 62a, 62b. Thus, the inner surfaces of posts 62a, 62b and the bottom surface 100b of the first panel 108 create a substantially smooth interior left wall in the cargo area.

The pin 150 of the right bed support 146 is passed through the aperture 117 in the bed 102 and the strap 148 is rolled and secured to the bottom surface of the cover 24 or alternatively to the right side 50 of the upper frame 46. The webbing 154 is detached from the bed 102 and the webbing is rolled and secured to the bottom surface of the cover 24 or alternatively to the right side 50 of the upper frame 46. The second panel 116 of the right bed 102 is rotated about the hinges 118 180 degrees counter clockwise so that it rests on the first panel 114. The first panel 114 is then rotated about the hinges 106 270 degrees counter clockwise so that the first panel 114 is generally parallel to the right wall 30 of the pick-up. In this folded and retracted position the second panel 116 will abut the right wheel well 42 and the first panel 114 will abut the second panel 116. The rolled right tent wall 122 will rest on top of the right wheel well 42. When retracted the bottom surface 102b of the first panel 114 will be substantially aligned with the inner surfaces of the posts 62c, 62d. Thus, the inner surfaces of posts 62c, 62d and the bottom surface 102b of the first panel 114 create a substantially smooth interior right wall in the cargo area.

Although pins 144, 150 have been described for securing the left bed support 140 and right bed support 146 to the left and right beds 100, 102, any suitable means can be used to secure the left and right bed supports 140, 146 to the left and right beds 100, 102.

The telescoping legs 80, 81, 82, 83 are then retracted and the upper frame 46 and the cover/roof 24 is lowered until the left, front and right edges of the cover 24 rest on the left side wall 28, front wall 32 and right side wall 30 respectively of the bed 22 of the pick-up truck. Finally, the tail gate 34 is rotated to the vertical position. As shown in FIG. 1, when the camper 20 is retracted, the camper 20 is completely concealed and the external appearance of the vehicle is no different than a pick-up truck equipped with a cover. In its retracted form, the camper 20 does not affect the aerodynamic characteristics of the vehicle.

As shown in FIG. 3, the camper 20 also allows for open cargo space between the wheel wells 40, 42, thus providing essentially the same amount of cargo space with the camper 20 installed in the truck as there is without the camper 20 installed in the truck. The cargo space between the wheel wells is essentially reduced only by the width of the folded beds 100, 102, for example, approximately one inch on each side of the cargo area.

The lower frame 47 is designed to allow access to the truck bed even when the camper 20 is retracted. Items need only be lifted over the U-shaped rear rails 60a, 60b to be placed in the cargo area 38. Additionally, the base portion 74 of the rear rail 60 can be tapered to allow for even easier placement of cargo in the bed. Or if the rear rail 60a, 60b are eliminated from the lower frame 47, the items can be place in the cargo area 38 without lifting the items over the rear rails 60a, 60b. Thus, the design of the camper 20 minimizes the impact on cargo clearance through the tailgate 34. In addition, the because the cover 24 is hingedly attached to the attachment bracket 52 of the upper frame 46, the cover 24 can be raised to provide additional clearance for loading items into the cargo area. The moveable brace 51 can be slid toward the front of the bed 22 to provide yet additional clearance for loading items into the cargo area.

In addition to the space between the wheel wells 40, 42, the areas in front of and to the rear of the wheel wells 40, 42 can be accessed and used for storage by lifting the beds 100, 102. When the camper 20 is retracted, the wheel wells 40, 42 are enclosed by the beds 100, 102 and the corner posts 62a, 62b, 62c, 62d. The bottom surfaces of the first panels 108, 114 of the beds 100, 102 along with the inner surfaces of the corners posts 62a, 62b, 62c, 62d provide a substantially smooth durable sidewall liner for the cargo area. Because items will not engage the wheel wells 40, 42 loading items into and unloading items from the pick-up truck is easier.

When the beds 100, 102 are extended, the beds 100, 102 are supported by the lower frame 47 through the left and right rails 64, 66, the left and right bed supports 140, 146, the upper frame 46, the legs 80, 81, 82, 83 and the posts 62a, 62b, 62c, 62d. When a person or items are positioned on the beds 100, 102, the weight of the persons or items is similarly supported, i.e. supported by the lower frame 47, through the left and right rails 64, 66, the left and right bed supports 140, 146, the upper frame 46, the legs 80, 81, 82, 83, and the posts 62a, 62b, 62c, 62d. The design of the camper 20 minimizes or eliminates the weight supported by the walls 28, 30, 32, 34 of the pick-up truck and does not require any portion of the load to be supported by the wheel wells 40, 42. Because the walls and the wheel wells of many pick-up trucks currently sold are not designed to support a significant amount of weight, this design provides a significant advantage in that the weight of the camper 20 and items placed on the beds 100, 102 is substantially supported by the camper 20 itself and not the walls 28, 30 and wheel wells 40, 42 of the truck.

Rather than mounting the lower frame 47 within the bed 22 of the truck, a frame for the camper could be integrated with the walls of the bed. The frame could, for example, be manufactured and installed at the same time the bed is manufactured. The left rail 64 could be placed in the left wall 28 and the right rail 66 could be placed in the right wall 30. The posts 62a, 62b, 62c 62d could also be contained in the left and right walls 28, 30. Currently, apertures are provided in the walls 28, 30 of the pick-up truck, these apertures could be enlarged to allow the telescoping legs to extend. The U-shaped rear rails 60a, 60b and front rails 58a, 58b could be mounted so that the base portion of each rail is positioned under the bottom wall of the bed 22 and the ends of each rail extends into the side wall 28, 30.

Figure 10:
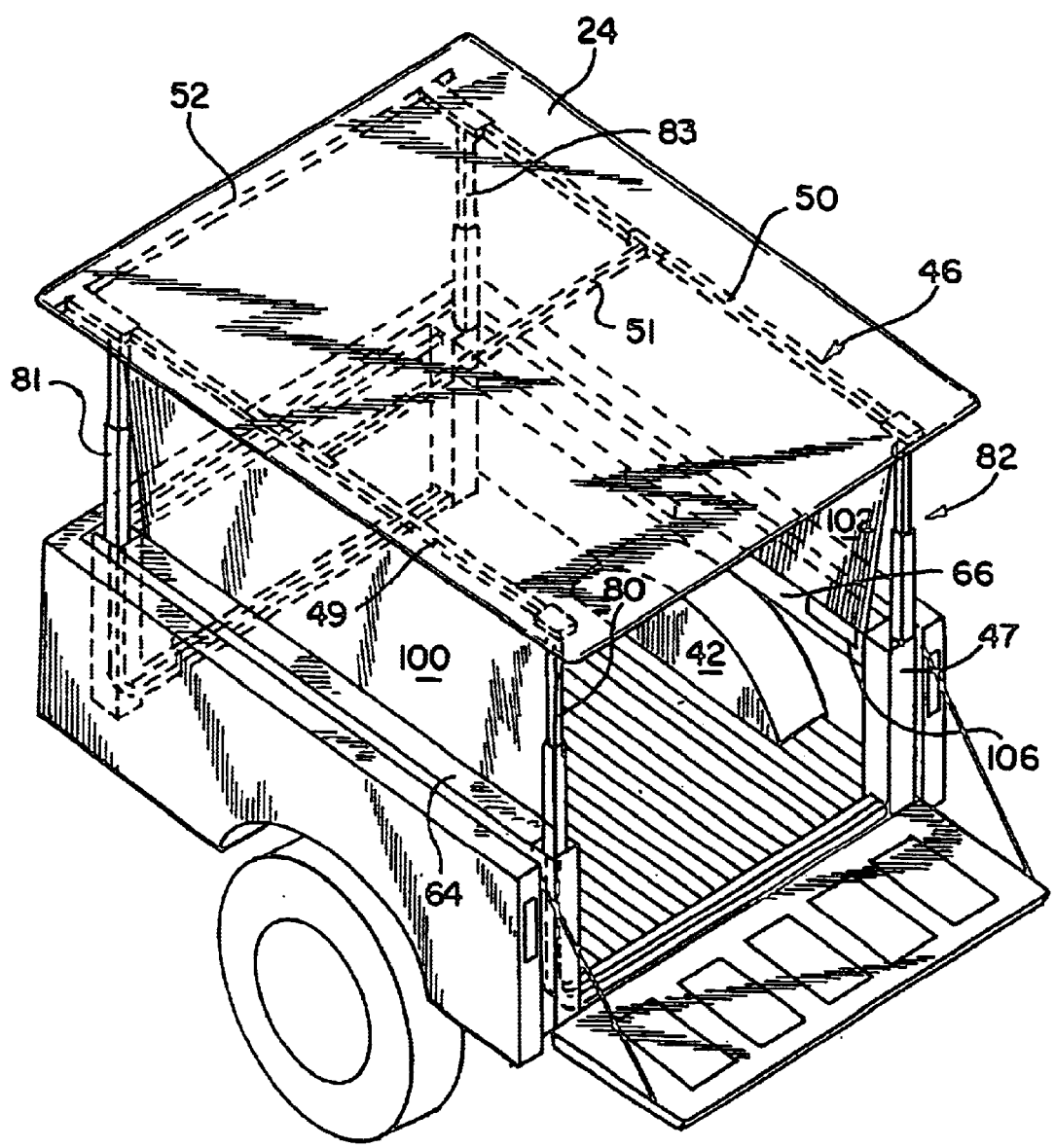
FIG. 10 is a perspective view of a portion of the camper with the cover raised to an intermediate height with some hidden elements shown in broken lines.

An alternative use for the camper 20 is shown in FIG. 10. The frame 46 and cover 24 can be raised to an intermediate height, preferably so that the cover 24 is aligned with the roof of the cab of the pick-up truck. Rather than rotating the folded beds 100, 102 270 degrees, the beds 100, 102 are rotated 180 degrees so that the free ends of the first panels 108, 114 are proximate the upper frame 46. Latches are used to secure the free end 108b of the first panel 108 to the left side 49 of the upper frame 46. Similarly, latches are used to secure the free end 114b of the first panel 114 to the right side 50 of the upper frame 46. With the camper 20 raised to this intermediate position, large items can be stored and/or transported in the cargo area than when the camper 20 is fully retracted. As the cover 24 is not raised above the roof of the cab of the pick-up truck, the aerodynamic qualities of the pick-up truck are not significantly affected and the pick-up truck can be driven with the camper 20 raised to this intermediate position. In addition, by aligning the cover 24 with the roof of the cab of the pick-up truck, a luggage rack can be mounted to the cover 24 to provide the ability to transport longer items which would not fit in the bed, such as ladders, canoes, kayaks, etc.

While a preferred embodiment of the present invention are shown and described, it is envisioned that those skilled in the art may devise various modifications of the present invention without departing from the spirit and scope of the attached claims.

The invention claimed is:

1. A camper for mounting in a bed of a pick-up truck, said camper comprising:
   a lower frame;
   adjustable legs extending from said lower frame, each of said legs having a bottom end and a top end;
   an upper frame connected to said top end of each of said legs;
   at least one bed attached to said lower frame;
   wherein the camper is extended when in use and the camper is retracted when stored or transported; and
   wherein when said camper is retracted, said camper is substantially contained within the bed of the pick-up truck and access to the bed of the pick-up truck is not substantially obstructed.

2. A camper as defined in claim 1, further including a roof attached to said upper frame.

3. A camper as defined in claim 2, further including a front tent wall mounted to said roof and a rear tent wall mounted to said roof, wherein when said camper is extended said front wall extends from said roof to the pick-up truck and said rear wall extends from the roof to the pick-up truck.

4. A camper as defined in claim 1, further including at least one side tent wall mounted to each of said at least one bed, wherein when said camper is extended said at least one side tent wall extends from said at least one bed to said upper frame.

5. A camper as defined in claim 1, wherein when said camper is retracted, said upper frame rests on said lower frame.

6. A camper as defined in claim 1, wherein said upper frame includes:
   a left side member having a front end and a rear end,
   a right side member having a front end and a rear end, wherein said right side member is generally parallel to said left side member, and
   an attachment bracket mounted between said front ends of said left side member and said right side member, wherein said attachment bracket is generally perpendicular to said left side member and said right side member.

7. A camper as defined in claim 6, wherein said upper frame further includes a moveable brace mounted between said left side member and said right side member and generally parallel to said attachment bracket.

8. A camper as defined in claim 6, further including a roof connected to said attachment bracket.

9. A camper as defined in claim 8, further including at least one lift cylinder attached between said upper frame and said roof for raising said roof from a closed position to an open position.

10. A camper as defined in claim 9, further including latches for securing said roof in said closed position.

11. Camper as defined in claim 1, wherein the bed of the pick-up truck includes a left wheel well and a right wheel well and wherein said lower frame includes:
   a left rear corner post having a top end and a bottom end,
   a left front corner post having a top end and a bottom end,
   a right rear corner post having a top end and a bottom end,
   a right front corner post having a top end and a bottom end,
   a left rail mounted between said top end of said left rear corner post and said top end of said left front corner post,
   a right rail mounted between said top end of said right rear corner post and said top end of said right front corner post, a front end support mounted between said left front corner post and said right front corner post, and wherein when the camper is mounted in the bed of the pick-up truck, said left rail is positioned over the left wheel well of the pick-up truck and the right rail is positioned over the right wheel well of the pick-up truck.

12. A camper as defined in claim 11, wherein when said camper is retracted said at least one bed is aligned with the inner surfaces of either said left rear corner post and said left front corner post or with said inner surfaces of said right rear corner posts and said right front corner post.

13. A camper as defined in claim 11, wherein said lower frame further includes a front rail mounted between said bottom end of said left front post and said bottom end of said right front post.

14. A camper as defined in claim 11, wherein said lower frame further includes a rear rail mounted between said bottom end of said left rear post and said bottom end of said right rear post.

15. A camper as defined in claim 12, wherein when said camper is retracted, said at least one bed is proximate a left wheel well or a right wheel well.

16. A camper as defined in claim 11, wherein one of said adjustable legs is positioned in said left rear post, one of said adjustable legs is positioned in said left front post, one of said adjustable legs is positioned in said right rear post, and one of said adjustable legs is positioned in said right front post.

17. A camper as defined in claim 11, wherein two beds are provided and defined by a left bed hingedly attached to said left rail and a right bed hingedly attached to said right rail.

18. A camper as defined in claim 12, wherein said at least one bed includes;

a first panel having a fixed end and a free end, a second panel having a fixed end and a free end, and wherein said fixed end of said first panel is hingedly attached to one of said left or right rails and said fixed end of said second panel is hingedly attached to said free end of said first panel.

19. A camper as defined in claim 11, wherein two beds are defined by a left bed including a fixed end and a free end and a right bed including a fixed end and a free end;

said fixed end of said left bed hingedly attached to said left rail;

said fixed end of said right bed hingedly attached to said right rail; and wherein when said camper is extended, said free end of said left bed is attached to said upper frame and said free end of said right bed is attached to said upper frame.

20. A camper for mounting in a bed of a pick-up truck the bed of the pick-up truck having left and right side walls, said camper comprising:

a lower frame including a plurality of retractable legs, each of said retractable legs having a bottom end and a top end;

a roof supported by said upper ends of said retractable legs;

at least one bed attached to said lower frame;

wherein said retractable legs are extended to lift said roof away from said lower frame when the camper is in use; and wherein said retractable legs are retracted to position said roof proximate said lower frame and said at least one bed is positioned generally parallel to the side walls of the bed of the pick-up truck and said at least one bed does not extend higher than the left and right side walls of the bed of the pick-up truck when said camper is not in use.

* * * * *